INVENTOR
OLAF RASMUSSEN
BY
ATTORNEY

July 14, 1964     O. RASMUSSEN     3,140,760
VEHICLE BRAKES

Filed July 25, 1960     2 Sheets-Sheet 2

INVENTOR
OLAF RASMUSSEN
BY *Walter W. Riedel*
ATTORNEY

United States Patent Office 3,140,760
Patented July 14, 1964

3,140,760
VEHICLE BRAKES
Olaf Rasmussen, R.R. 2, Box 453, Port Clinton, Ohio;
Helga Rasmussen, executrix of said Olaf Rasmussen,
deceased
Filed July 25, 1960, Ser. No. 45,090
6 Claims. (Cl. 188—78)

This invention relates to improvements in brakes which are particularly adapted for use on automobiles.

The standard automobile brake consists of a brake drum attached to the vehicle wheel so as to rotate therewith. In this drum a brake shoe assembly provided with a friction lining, is operative frictionally to engage the drum for braking purposes. Repeated and excessive braking applications causes the drum to become hot. In fact, as a result of severe braking applications, the frictionally engaged surface of the drum will become red hot, often to a substantial depth.

Tests have proven that the frictional characteristics of brake shoe linings drop enormously as the heat of the brake drum increases and thus the braking effort of the lining upon the rotating drum decreases accordingly, resulting in a brake failure known as "fading." When severe braking effort is applied and the drum becomes extremely hot, "fading" may reach the point of complete brake failure and consequent disastrous results.

The practice has been to provide cooling fins on the outside perimeter of the drum for heat dissipation. Frequent or excessive use of the brake causes the heat build-up to exceed the ability of the finned brake drum to dissipate this heat sufficiently to avoid the red hot condition of the inner brake drum surface. Under these conditions the brake is rendered undependable and unable to stop or even appreciably decelerate the vehicle within a safe distance.

It is among the objects of the present invention to provide an automobile brake constructed and arranged interiorly as to reduce heat build-up to a substantially safe minimum and thus prevent brake "fading" under all conditions.

A further object of the present invention is to provide an automobile brake with means for creating a cooling and cleaning air flow through the brake interior in response to forward movement of the vehicle equipped therewith.

A still further object of the present invention is to provide an automobile brake with a minimum amount of brake lining frictionally to engage the brake drum so as to stop the vehicle under substantially all conditions, thus leaving a substantial area of drum surface directly exposed to cooling air flow and thereby greatly reducing heat build-up.

Further objects and advantages of the present invention will be apparent from the following description, reference being had to the accompanying drawings which illustrate a preferred form of construction.

Figures 1, 2:
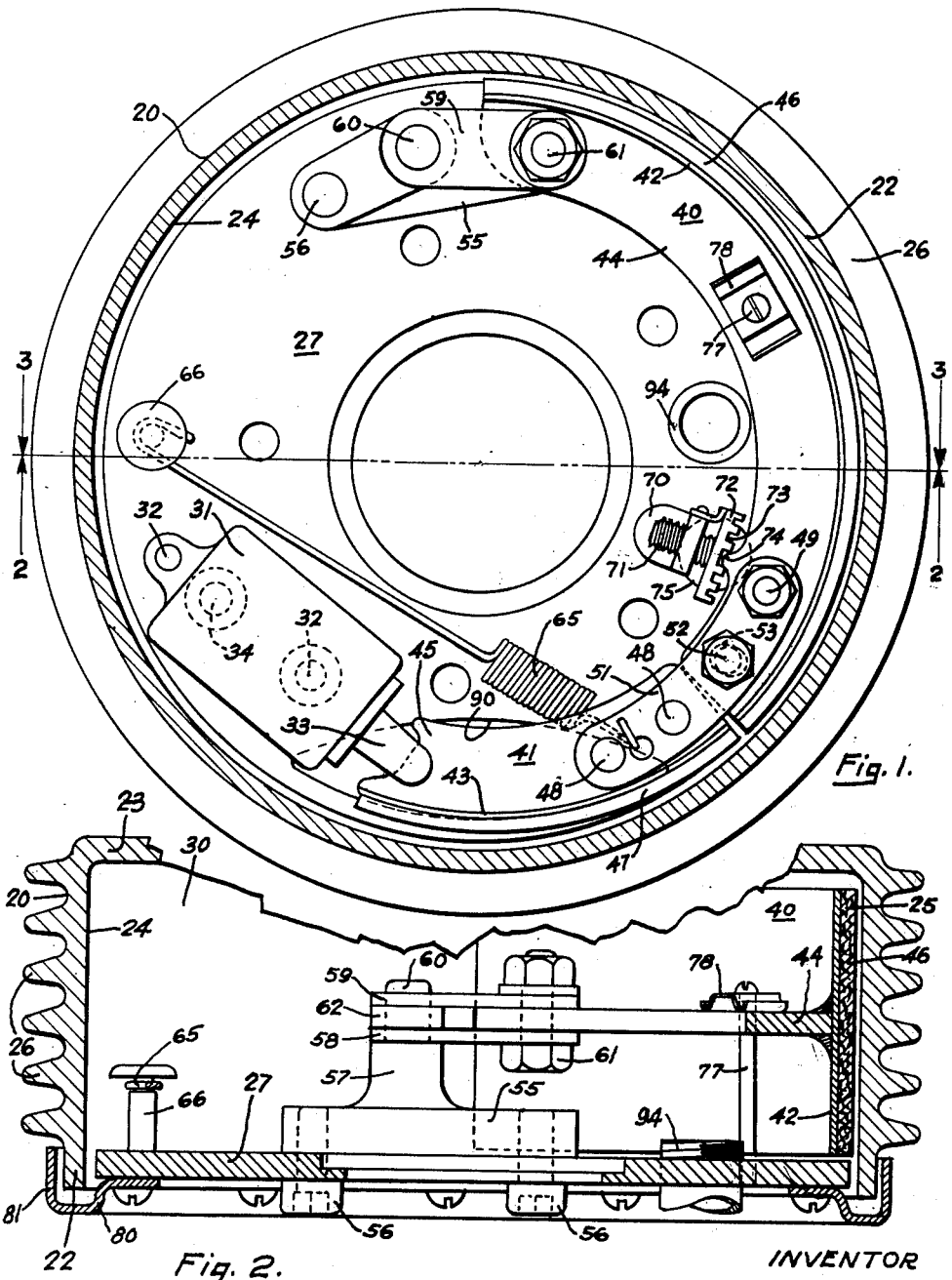
FIG. 1 is a view into the interior of the brake, the drum being broken away to show the interior.
FIG. 2 is a sectional view taken along the line and in the direction of the arrows 2—2 of FIG. 1.

Referring to the drawings, the brake drum 20, which is attached to the vehicle wheel 21 in the usual manner, has a cylindrical wall portion 22 and an end plate portion 23. The inner surface 24 of the wall portion 22 is frictionally engageable by the lining 25 of the brake shoe assembly and the outer surface thereof is provided with cooling fins 26.

A stationary backing plate 27, in the form of a disc, is located within the open end of the brake drum 20. This plate 27 is attached to the nonrotatable axle housing 28 in which the drive shaft 29 of the vehicle wheel 21 is journalled. Plate 27 supports the operating mechanism contained within the brake drum chamber 30. One member of this operating mechanism is the power cylinder 31 secured to the plate 27 by bolts 32. A piston actuated plunger 33 is urged outwardly of the cylinder 31 when hydraulic power from any suitable source is directed into the cylinder through its inlet port 34.

Inside the drum chamber 30, a brake shoe assembly is provided, one end of said shoe assembly being pivotally supported by the backing plate 27, the other end being operatively engaged by the plunger 33 of the power cylinder. Brake lining is provided by the shoe assembly, said lining frictionally engaging the drum surface 24 when the power cylinder is energized to actuate the shoe assembly.

The feature of the present invention is to provide a brake shoe assembly having a plurality of brake shoes or segments each carrying a friction lining. The drawings show two brake shoe segments 40 and 41, arcuated to coincide with the contour of the drum surface 24. The segment 40 is predeterminately longer than the segment 41, the combined length of both segments being substantially greater than one half the circumferential length of the drum surface 24 and less than two thirds the length of said surface. The shoe segments 40 and 41 consist of an arcuate plate 42 and 43 respectively, each provided with a stiffening web 44 and 45 respectively. The outer face of plate 42 has a friction lining 46 and plate 43, a friction lining 47 attached thereto.

Figure 3:
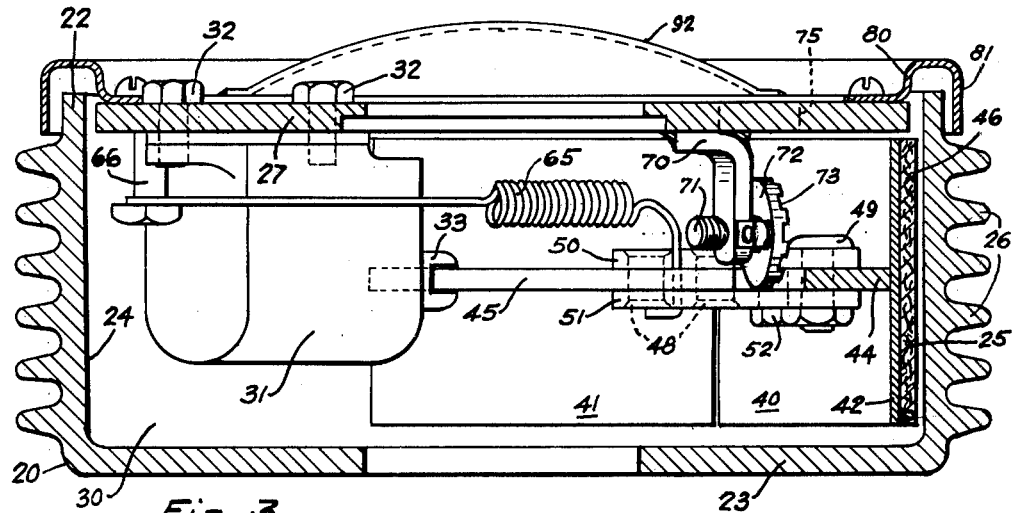
FIG. 3 is a sectional view taken in the direction of the arrows 3—3 of FIG. 1.
Figure 4:
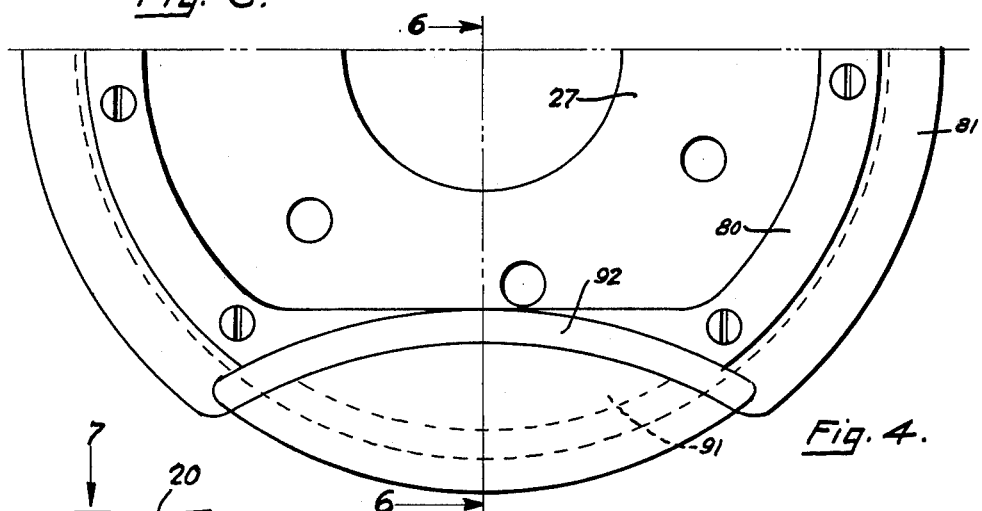
FIG. 4 is a fragmentary view of the brake showing the air flow shell.

The adjacent ends of segments 40 and 41 are hingedly secured one to the other in such a manner that they are relatively concentric when moved toward and into frictional engagement with the drum surface 24, and eccentric when moved out of frictional engagement with the drum. FIG. 3 shows hinge strips 50 and 51 with the adjacent ends of the web portions 44 and 45 of shoe segments 40 and 41 sandwiched therebetween. Strips 50 and 51 are rigidly attached to the web portion 45 of shoe 41 by rivets 48, and pivotally connected to web portion 44 of shoe 40 by a bolt 49. A limiting bolt 52 extends through fitting openings in strips 50 and 51, and through an elongated opening 53 in the web portion 44, thus limiting the movement of shoe segment 41 relatively to the segment 40. This causes the linings 46 and 47 on segments 40 and 41 respectively to be concentric when said segments are actuated frictionally to engage the drum surface 24, and predeterminately eccentric when said segments are moved to disengage said drum surface.

As shown in FIGS. 1 and 2, brake shoe segment 40 is pivotally secured to backing plate 27. A supporting block 55 is attached to plate 27 by bolts 56. Block 55 has an extending lug portion 57 which provides a platform upon which hinge link 58 rests. A reduced diameter portion on lug 57 forms a pivot pin 60 which extends through an opening in hinge link 58 and a spacer collar 62 upon which rests the hinge link 59. The web 44 of segment 40 fits between the spaced hinge links 58 and 59, said links being attached to the web 44 by bolt 61. Thus when the power cylinder is energized, its plunger 33 acting upon segment 41, will move said segment about its pivot pin 49 until said segment is substantially concentric with segment 40 as established by the elongated slot or opening 53 cooperating with limiting bolt 52. Continuing action by the power cylinder 31 will move the shoe assembly about its pivot pin 60 until the friction lining 46–47 on shoe segments 40–41 respectively, engage the drum surface 24. A retractor spring 65 has its one end secured to a bolt 66 on backing plate 27, the other end being attached to the shoe segment 41. Upon deenergization of power cylinder 31, spring 65 withdraws the brake shoe assembly from frictional engagement with the brake drum, first moving the segment 41 about its pivot pin 49 into the predetermined eccentricity relatively to its companion brake segment 40, established by the elongated opening 53 and its cooperating pin 52. This withdrawal movement of the shoe assembly by spring 65 is limited by a stop member.

The said stop member comprises a rigid bracket 70 attached to the backing plate 27. A threaded bolt 71, having a disc shaped head 72 is carried by bracket 70, the peripheral edge of said head 72 having a plurality of notches 73 equally spaced. A hump 74 on the inner edge of web portion 44 segment 40 is urged to seat in one of said notches 73 under the influence of retractor spring 65, thus maintaining the proper spacing between the brake shoe lining in its normal, inoperative position and the brake drum surface 24. When, due to lining wear, this spacing becomes sufficiently wide to permit rotation of the notched bolt head 72, and the consequent riding of the web hump 74 from its occupied notch over the peripheral surface of the head 72 into the next adjacent notch, the resultant movement of bolt 71 toward the segment 40 will again establish the proper lining and drum clearance. A hole 75 in the backing plate renders the head member 72 available from outside the brake.

A bolt 77 passing through the web portion of brake shoe segment 40 and threaded into the backing plate 27, carries a spring plate 78 which engages the web 44 of the segment 40 and holds the brake shoe assembly in alinement with its hinge plates and the power cylinder plunger 33.

A dust cover plate 80 has an angular edge portion 81 spaced from and shaped to embrace or surround the outer edge of the cylindrical drum portion 22. This provides a path for air flow to enter into the drum chamber 30 and directly impinge upon the area of the interior drum surface not covered or engaged by the brake shoe. Cover plate 80 tends to keep dirt and stones from entering the drum chamber 30 yet permits air to circulate through said chamber.

As has previously been stated, excessive or severe brake applications causes the brake drum to become heated. At times the frictionally engaged surface 24 of the drum becomes red hot and continued brake applications will cause a heat build-up that cannot be sufficiently dissipated to prevent brake "fading" or complete failure. With rising drum temperatures the frictional characteristics of the brake lining drops enormously and with a red hot drum, complete lining failure and a useless brake can be expected.

The brake of the present invention is designed and constructed to cool the brake interiorly rather than exteriorly by heat dissipation through cooling fins 26. First of all, the brake is designed to provide sufficient braking effort completely to stop, under prescribed conditions, the particular vehicle equipped therewith. Secondly, the entire area of the brake shoe assembly which frictionally engages the brake drum is substantially greater than one half and less than two thirds of the area of the brake drum surface 24 frictionally engagable by the brake shoe lining 46–47. Thus more than 33% of the brake drum surface 24 is not frictionally engaged by the shoe lining, but on the contrary is directly exposed to the cooling air flow through the brake, resulting in a substantial heat reduction of the entire brake, thereby eliminating "fading" of the brake under practically all conditions. The brake of the present invention has a brake shoe which frictionally engages more than one half and less than two thirds of the circumferential length of the brake drum surface 24. To assure complete separation of the shoe from the brake drum, the shoe is made up of a plurality of segments hingedly connected one to the other, so that when they are moved toward drum engagement they are concentric, and when moved out of drum engagement they are eccentric to provide proper clearance.

Figure 6:
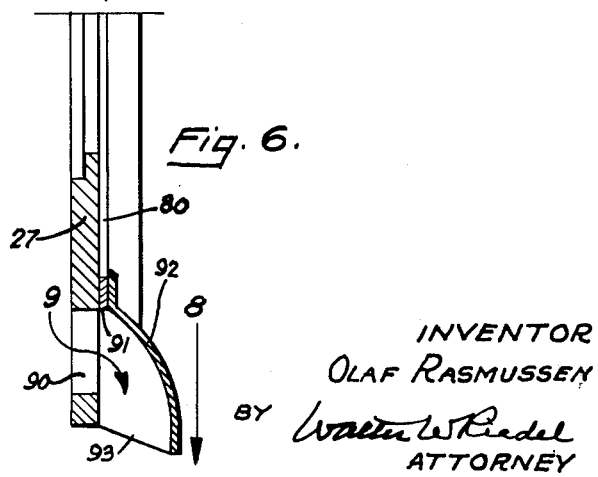
FIG. 6 is a sectional view taken along the line 6—6 of FIG. 4.

To provide a substantial air flow through the brake, the present invention provides an opening 90 in the backing plate 27 and a cut-away portion 91 in the dust cover 80 communicating with opening 90. An ear-shaped baffle shell 92 covers openings 90 and 91 and has its open side 93 directed toward the rear of the brake when said brake is applied to the vehicle axle 28. Thus when the vehicle is operated forwardly, air flow over the baffle shell 92 in the direction of the arrow 8 in FIG. 6, will cause air circulation through the brake drum and out in the direction of arrow 9.

Figure 5:
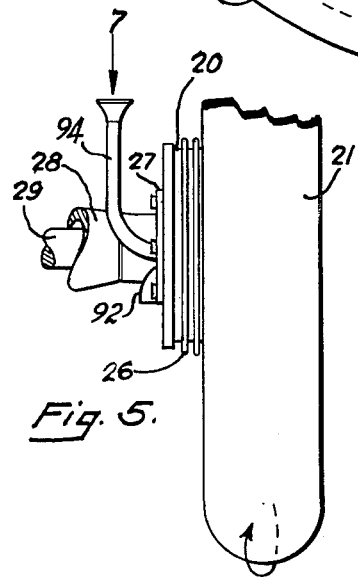
FIG. 5 is a fragmentary, schematic top plan view of an automobile axle and wheel equipped with the present invention.

FIG. 5 shows an additional or alternative air circulating means in the form of a pipe 94 leading into the interior of the brake drum, said pipe having a funnel shaped outer end, directed forwardly of the vehicle equipped therewith. These air circulating means, shell 92 or pipe 94, create an air flow through the brake interior which reduces heat build-up sufficiently to practically eliminate "fading" or complete brake failure.

Frictional engagement of the lined brake shoes with the brake drum will cause the lining to wear away which results in an accumulation of power within the brake. This not only hinders cooling of the brake, but also is detrimental to the proper operation thereof. The aforedescribed air flow through the brake not only cools the brake, but also sweeps said powder and dust from the interior of the drum chamber 30.

From the aforegoing description it is apparent that the present invention provides a vehicle brake in which heat build-up is held to a safe minimum by interior cooling of the brake, thereby eliminating the undesirable and dangerous "fading" or even complete failure of the brake to function.

What is claimed is as follows:

1. A brake comprising in combination, a stationary disc; a rotatable brake drum; a composite brake shoe assembly pivotally supported by the stationary disc and movable into frictional engagement with the brake drum, said brake shoe assembly consisting of a plurality of arcuate segments; attaching means for hingedly attaching adjacent ends of said segments one to the other in such a manner that said arcuate segments are concentric when moved into frictional engagement with the brake drum, and predeterminately out of concentricity when moved out of engagement with said drum; an actuator attached to the stationary disc and operative on one end of the composite brake shoe assembly to urge the same into frictional engagement with the brake drum; and a spring anchored to the disc and shoe assembly, operative to retract the shoe assembly from engagement with said drum, and in which combination said attaching means includes a hinge strip rigidly attached to one of said segments and pivotally connected to the other of said segments by a bolt and limited in its pivotal movement with said other segment by a second bolt having an elongated opening connection between said hinge strip and said other of said segments.

2. A brake according to claim 1 in which a stop member adjustable from outside said stationary disc is provided and mounted on said disc to limit pivotal movement of said brake shoe with respect to said stationary disc.

3. A brake comprising in combination, a stationary disc; a rotatable brake drum; a single actuator attached to said disc; a segmental brake shoe assembly consisting of two arcuate segments; attaching means for hingedly attaching adjacent ends of said segments one to the other to permit them to move into and out of concentricity as they are actuated into and out of frictional engagement with the brake drum respectively; pivoting means for pivotally attaching the one segment to the stationary disc; means for engaging and operating the other segment by the actuator to cause the shoe assembly frictionally to engage the drum; and a single retractor spring operative to urge the segments of the brake shoe into normal, drum disengaging, relatively eccentric positions, and in which combination said attaching means includes a hinge strip rigidly attached to one of said segments and pivotally connected to the other of said segments by a bolt and limited in its pivotal movement with said other segments by a second bolt having an elongated opening connection between said hinge strip and said other of said segments.

4. A brake according to claim 3 in which a stop member adjustable from outside said stationary disc is provided and mounted on said disc to limit pivotal movement of said one segment with respect to said stationary disc.

5. A brake comprising in combination, a stationary disc; a rotatable brake drum; a single actuator attached to said disc; a segmental brake shoe assembly within the drum, said shoe assembly consisting of a plurality of arcuate segments in a circular row; attaching means for hingedly attaching adjacent ends of said segments one to the other for relative movement therebetween to effect concentricity for concurrent engagement of the segments with the brake drum and eccentricity for successive separation of said segments from said drum; pivoting means for pivotally attaching one of said segments to the stationary disc; means for operatively engaging the actuator with another of said segments; and a single retractor spring operative to urge the segmental brake shoe out of drum engagement, and in which combination said attaching means includes a hinge strip rigidly attached to one of said segments and pivotally connected to the other of said segments by a bolt and limited in its pivotal movement with said other segment by a second bolt having an elongated opening connection between said hinge strip and said other of said segments.

6. A brake according to claim 5 in which a stop member adjustable from outside said stationary disc is provided and mounted on said disc to limit pivotal movement of said one segment with respect to said stationary disc.

References Cited in the file of this patent

UNITED STATES PATENTS

| | | |
|---|---|---|
| 1,908,460 | Thomas | May 9, 1933 |
| 1,939,701 | Hopkins | Dec. 19, 1933 |
| 2,060,873 | La Brie | Nov. 17, 1936 |
| 2,105,176 | Ash | Jan. 11, 1938 |
| 2,106,702 | Campbell | Feb. 1, 1938 |
| 2,131,369 | Brisson | Sept. 27, 1938 |
| 2,576,538 | Ross | Nov. 27, 1951 |
| 2,868,337 | Holl | Jan. 13, 1959 |

FOREIGN PATENTS

| | | |
|---|---|---|
| 615,531 | France | Jan. 10, 1927 |